(12) United States Patent
Yamano

(10) Patent No.: US 10,566,894 B2
(45) Date of Patent: Feb. 18, 2020

(54) THREE-PHASE/SINGLE-PHASE ALTERNATING-CURRENT POWER SUPPLY COMPATIBLE ELECTRICALLY DRIVEN HOISTING MACHINE

(71) Applicant: KITO CORPORATION, Nakakoma-gun, Yamanashi (JP)

(72) Inventor: Tadashi Yamano, Nakakoma-gun (JP)

(73) Assignee: KITO CORPORATION, Nakakoma-gun (JP)

( * ) Notice: Subject to any disclaimer, the term of this patent is extended or adjusted under 35 U.S.C. 154(b) by 0 days.

(21) Appl. No.: 16/347,675

(22) PCT Filed: Dec. 8, 2017

(86) PCT No.: PCT/JP2017/044231
§ 371 (c)(1),
(2) Date: May 6, 2019

(87) PCT Pub. No.: WO2018/123521
PCT Pub. Date: Jul. 5, 2018

(65) Prior Publication Data
US 2019/0319529 A1 Oct. 17, 2019

(30) Foreign Application Priority Data

Dec. 27, 2016 (JP) .................................. 2016-254402

(51) Int. Cl.
*H02M 1/10* (2006.01)
*H02M 5/458* (2006.01)
(Continued)

(52) U.S. Cl.
CPC ............ *H02M 1/10* (2013.01); *H02M 5/4585* (2013.01); *H02M 7/06* (2013.01); *H02M 7/28* (2013.01)

(58) Field of Classification Search
CPC .......... H02M 1/10; H02M 1/32; H02M 5/458; H02M 5/4585; H02M 7/04; H02M 7/06; H02M 7/217; H02M 7/28
See application file for complete search history.

(56) References Cited

U.S. PATENT DOCUMENTS

| 3,573,600 | A | * | 4/1971 | Carlisle | .................. | H02M 7/48 363/71 |
| 5,055,989 | A | * | 10/1991 | Carroll | .................. | H02M 5/458 363/36 |
| 2018/0234026 | A1 | * | 8/2018 | Wright | .................. | H02M 7/062 |

FOREIGN PATENT DOCUMENTS

| JP | 61-55077 A | 3/1986 |
| JP | 5-130783 A | 5/1993 |

(Continued)

OTHER PUBLICATIONS

International Search Report dated Feb. 27, 2018, issued in counterpart International Application No. PCT/JP2017/044231 (1 page).

*Primary Examiner* — Matthew V Nguyen
(74) *Attorney, Agent, or Firm* — Westerman, Hattori, Daniels & Adrian, LLP

(57) ABSTRACT

A three-phase alternating-current power supply compatible electrically driven hoisting machine having a three-phase alternating-current input terminal, a three-phase rectifier circuit, a direct-current circuit, an inverter, and a three-phase alternating-current motor is changed into a single-phase alternating-current power supply compatible electrically driven hoisting machine by attaching a single-phase AC-DC converter unit having a single-phase alternating-current input terminal, a single-phase AC-DC converter, and a direct-current circuit to the three-phase alternating-current power supply compatible electrically driven hoisting machine and connecting the P and N electrodes of a direct-current output terminal of the single-phase AC-DC converter (Continued)

unit to the P and N electrodes of the direct-current circuit, respectively, and further open-circuiting the three-phase alternating-current input terminal.

18 Claims, 9 Drawing Sheets

(51) Int. Cl.
*H02M 7/06* (2006.01)
*H02M 7/28* (2006.01)

(56) References Cited

FOREIGN PATENT DOCUMENTS

| | | |
|---|---|---|
| JP | 7-131982 A | 5/1995 |
| JP | 2008-206260 A | 9/2008 |
| JP | 2008-206261 A | 9/2008 |

\* cited by examiner

THREE-PHASE/SINGLE-PHASE ALTERNATING-CURRENT POWER SUPPLY COMPATIBLE ELECTRICALLY DRIVEN HOISTING MACHINE

TECHNICAL FIELD

The present invention relates to a three-phase/single-phase alternating-current power supply compatible electrically driven hoisting machine whereby a three-phase alternating-current power supply compatible electrically driven hoisting machine equipped with an inverter can be easily changed into a single-phase alternating-current power supply compatible electrically driven hoisting machine simply by adding, to the three-phase alternating-current power supply compatible electrically driven hoisting machine, a single-phase AC-DC converter unit converting a single-phase alternating current into a direct current with a simple structure, the electrically-driven hoisting machine being usable as a three-phase alternating-current power supply compatible electrically driven hoisting machine as it is, if not equipped with the single-phase AC-DC converter unit.

BACKGROUND ART

Conventionally, many of electrically driven hoisting machines, such as electrically driven chain blocks (usually referred to as "electric chain blocks") and electrically driven hoists, are of the three-phase alternating-current power supply compatible type, and there are few single-phase alternating-current power supply compatible electrically driven hoisting machines. In many cases, single-phase alternating-current power supply compatible electrically driven hoisting machines are equipped with a single-phase only electric motor as a load hoisting up-down electric motor to cope with the situation.

CITATION LIST

Patent Literature

PTL 1: Japanese Patent Application Publication No. Hei 5-130783
PTL 2: Japanese Patent Application Publication No. Hei 7-131982

SUMMARY OF INVENTION

Technical Problem

The above-described single-phase alternating-current power supply compatible electrically driven hoisting machine equipped with a single-phase only electric motor has problems that it is difficult to reduce the size of the single-phase only electric motor, and the single-phase only electric motor is lower in output and slower in speed than a three-phase alternating-current electric motor of the same size. Consequently, the conventional single-phase alternating-current power supply compatible electrically driven hoisting machine is lower in output and slower in hoisting up-down speed than an electrically driven hoisting machine equipped with a three-phase electric motor of the same size. Accordingly, in order to increase the output and to raise the hoisting up-down speed, the single-phase alternating-current power supply compatible electrically driven hoisting machine has to be inevitably increased in size. Thus, it is difficult to achieve a size reduction unfavorably.

Further, there are the following problems. Since there is a little demand for single-phase alternating-current power supply compatible electrically driven hoisting machines, and a single-phase only electric motor is mounted as a load hoisting up-down electric motor, the cost increases. Moreover, the financial burden increases if a large stock of single-phase alternating-current power supply compatible electrically driven hoisting machines is held in expectation of a demand therefor. Therefore, it is often the case that a production is performed after receiving an order, and consequently, a long period of time is required from receipt of order to delivery of product. In addition, the price is unfavorably high.

It is also conceivable to adopt a technique of changing a three-phase rectifier circuit to a single-phase rectifier circuit, as disclosed in PTL 1 and PTL 2, in the three-phase rectifier circuit of a publicly known three-phase alternating-current power supply compatible electrically driven hoisting machine equipped with an inverter, thereby transforming the three-phase alternating-current power supply compatible electrically driven hoisting machine into a single-phase alternating-current power supply compatible electrically driven hoisting machine. This method, however, has problems that a large number of parts of the power supply circuit need to be changed in order to change a three-phase rectifier circuit to a single-phase rectifier circuit, and that a large number of process steps are required for the change, resulting in an increase in cost.

The present invention has been made in view of the above-described circumstances. Accordingly, an object of the present invention is to provide an inverter-equipped three-phase/single-phase alternating-current power supply compatible electrically driven hoisting machine whereby a three-phase alternating-current power supply compatible electrically driven hoisting machine equipped with an inverter and an alternating-current electric motor can be changed into a single-phase alternating-current power supply compatible electrically driven hoisting machine simply by equipping the three-phase alternating-current power supply compatible electrically driven hoisting machine with a single-phase AC-DC converter unit converting a single-phase alternating current into a direct current with a simple structure, and which enables the single-phase alternating-current power supply compatible electrically-driven hoisting machine to be substantially equal in output, hoisting up-down speed, and price to a publicly known inverter-equipped three-phase alternating-current power supply compatible electrically driven hoisting machine, and which makes it possible to greatly reduce the length of time from receipt of order to shipment of product.

Solution to Problem

To solve the above-described problem, the present invention provides a three-phase/single-phase alternating-current power supply compatible electrically driven hoisting machine characterized by including an inverter-equipped electrically driven hoisting machine body of three-phase alternating-current power supply compatible type, and a single-phase AC-DC converter unit. The inverter-equipped electrically driven hoisting machine body has a three-phase alternating-current input terminal to which a three-phase alternating-current power supply is connectable, a three-phase AC-DC convert converting a three-phase alternating current input to the three-phase alternating-current input terminal into a direct current, a direct-current circuit connected to the output side of the three-phase AC-DC converter, an inverter connected to the output side of the direct-current circuit and converting a direct current electric power from the direct-current circuit into alternating-current electric power having a predetermined phase and a predetermined frequency, an alternating-current electric motor for load hoisting up and down connected to the output side of the inverter, and a converting mechanism converting a rotational force of the alternating-current electric motor into a hoisting up-down force of a load hanging device. The single-phase AC-DC converter unit has a single-phase alternating-current input terminal to which a single-phase alternating-current power supply is connectable, and a single-phase AC-DC converter converting a single-phase alternating current input to the single-phase alternating-current input terminal into a direct current. When the inverter-equipped electrically driven hoisting machine body is to be used as a three-phase alternating-current power supply compatible type, the single-phase AC-DC converter unit is not used, and the three-phase alternating-current power supply is connected to the three-phase alternating-current input terminal. When the inverter-equipped electrically driven hoisting machine body is to be used as a single-phase alternating-current power supply compatible type, the single-phase AC-DC converter unit is attached to the inverter-equipped electrically driven hoisting machine body, and the output side of the single-phase AC-DC converter unit is connected to the direct-current circuit. The three-phase alternating-current input terminal is open-circuited from the three-phase alternating-current power supply, and the single-phase alternating-current power supply is connected to the single-phase alternating-current input terminal of the single-phase AC-DC converter unit.

In addition, the present invention is characterized as follows. In the three-phase/single-phase alternating-current power supply compatible electrically driven hoisting machine, the alternating-current electric motor and the converting mechanism of the inverter-equipped electrically driven hoisting machine body are accommodated in a casing. The casing has a side covered with a cover. The cover has an interior defining an electrical component accommodating chamber accommodating electrical components. The electrical component accommodating chamber is capable of accommodating and disposing therein the single-phase AC-DC converter unit.

In addition, the present invention is characterized as follows. In the three-phase/single-phase alternating-current power supply compatible electrically driven hoisting machine, the single-phase AC-DC converter unit has an output voltage adjusting device having a power supply voltage switching device and enabling a direct-current output voltage value of the single-phase AC-DC converter unit to be kept at a predetermined constant value even if the single-phase alternating-current power supply voltage input to the single-phase alternating-current input terminal is different by switching the power supply voltage switching device.

In addition, the present invention is characterized as follows. In the three-phase/single-phase alternating-current power supply compatible electrically driven hoisting machine, the single-phase AC-DC converter unit has a circuit board and a heat dissipation plate made of a material of excellent thermal conductivity, the heat dissipation plate being installed underneath the circuit board. The single-phase AC-DC converter of the single-phase AC-DC converter unit comprises a diode bridge. The diode bridge is mounted on the heat dissipation plate, and the other components of the single-phase AC-DC converter unit are mounted on the circuit board. The heat dissipation plate is disposed such that a surface of the heat dissipation plate on a side thereof remote from the circuit board is in contact with an end casing covering a side end of the casing.

In addition, the present invention is characterized as follows. In the three-phase/single-phase alternating-current power supply compatible electrically driven hoisting machine, the single-phase AC-DC converter unit has an inrush current suppressing device suppressing an inrush current when the single-phase alternating-current power supply is turned on.

In addition, the present invention is characterized as follows. In the three-phase/single-phase alternating-current power supply compatible electrically driven hoisting machine, the inrush current suppressing device has a thermistor connected between the single-please alternating-current input terminal and the single-phase AC-DC converter of the single-phase AC-DC converter unit, a bypass device bypassing the thermistor, and a drive circuit driving the bypass device. The drive circuit has connected thereto a single-phase rectifier circuit, and a delay capacitor connected to the output side of the single-phase rectifier circuit. The single-phase AC-DC converter unit is configured such that the single-phase AC-DC converter and the drive circuit are simultaneously supplied with the single-phase alternating-current power supply. The bypass device operates to bypass the thermistor when the charge voltage of the delay capacitor reaches a predetermined voltage value.

In addition, the present invention is characterized in that the three-phase/single-phase alternating-current power supply compatible electrically driven hoisting machine is equippable with a noise filter removing noise generated in the process of conversion of a direct current from the direct-current circuit into an alternating current by the inverter.

Advantageous Effects of Invention

According to the present invention, when a three-phase alternating-current power supply compatible electrically driven hoisting machine is demanded, the single-phase AC-DC converter unit is not used, but a three-phase alternating-current power supply is connected to the three-phase alternating-current input terminal, thereby making it possible to meet the demand. When a single-phase alternating-current power supply compatible electrically driven hoisting machine is demanded, it is possible to meet the demand simply by adding a simple process in which the single-phase AC-DC converter unit is attached to the inverter-equipped electrically driven hoisting machine body, and in which the output side of the single-phase AC-DC converter unit is connected to the direct-current circuit, and a single-phase alternating-current power supply is connected to the single-phase alternating-current input terminal of the single-phase rectifier unit. Accordingly, the above-described demands can be met if the inverter-equipped electrically driven hoisting machine body is prepared in advance, which is common to the three-phase alternating-current power supply compatible electrically driven hoisting machine and the single-phase alternating-current power supply compatible electrically driven hoisting machine. That is, when an order for a three-phase alternating-current power supply compatible electrically driven hoisting machine is received, the inverter-equipped electrically driven hoisting machine body is used as a three-phase alternating-current power supply compatible electrically driven hoisting machine as it is, as a matter of course. When an order for a single-phase alternating-current power supply compatible electrically driven hoisting machine is received, it is possible to meet the order simply by adding a simple process of attaching the single-phase AC-DC converter unit of simple structure to the inverter-equipped electrically driven hoisting machine body. In particular, when an order for a single-phase alternating-current power supply compatible electrically driven hoisting machine is received, a product having a performance substantially equal to that of a publicly known three-phase alternating-current power supply compatible electrically driven hoisting machine can be delivered in a greatly reduced delivery time as compared to the past and at a price determined by merely adding the price of a less costly single-phase AC-DC converter unit and the cost of a simple process of attaching the single-phase AC-DC converter unit and so forth to the price of a publicly known three-phase alternating-current power supply compatible electrically driven hoisting machine. Thus, it is possible to obtain an excellent advantageous effect.

Further, according to the present invention, the single-phase rectifier unit can be accommodated and disposed in the electrical component accommodating chamber. Therefore, the single-phase rectifier unit can be attached without the need to adapt the inverter-equipped electrically driven hoisting machine body to a considerable extent, which makes it possible to further enhance the above-described advantageous effect.

Further, according to the present invention, even if the voltage value of a single-phase alternating current input to the single-phase alternating-current input terminal is different, e.g. 115 V or 230 V, the direct-current output voltage value of the single-phase rectifier unit can be kept at a predetermined constant value simply by switching the single-phase alternating-current power supply voltage switching device.

Further, according to the present invention, a diode bridge constituting the single-phase AC-DC converter, which generates a large amount of heat, is mounted on a heat dissipation plate, and the heat dissipation plate is disposed such that a surface of the heat dissipation plate on a side thereof remote from the circuit board is in contact with an end casing. Therefore, heat generated from the diode bridge is transmitted to the casing through the heat dissipation plate and thus dissipated efficiently.

Further, according to the present invention, the single-phase rectifier unit has an inrush current suppressing device suppressing an inrush current when the single-phase alternating-current power supply is turned on. Therefore, it is possible to suppress an inrush current flowing in from the single-phase alternating-current power supply.

Further, according to the present invention, the bypass device of the inrush current suppressing device operates to bypass the thermistor when the charge voltage of the delay capacitor reaches a predetermined voltage value. Therefore, the thermistor can be bypassed in accordance with the way in which the inrush current actually changes. Accordingly, it is possible to reliably prevent inflow of excessive inrush current when the single-phase alternating-current power supply is turned on and the thermistor can be disabled when the inrush current becomes below a predetermined level.

Further, according to the present invention, a noise filter is attachable. Therefore, it is possible to remove noise generated in the process of conversion of a direct current into an alternating current by the inverter.

DESCRIPTION OF EMBODIMENTS

Figure 1:
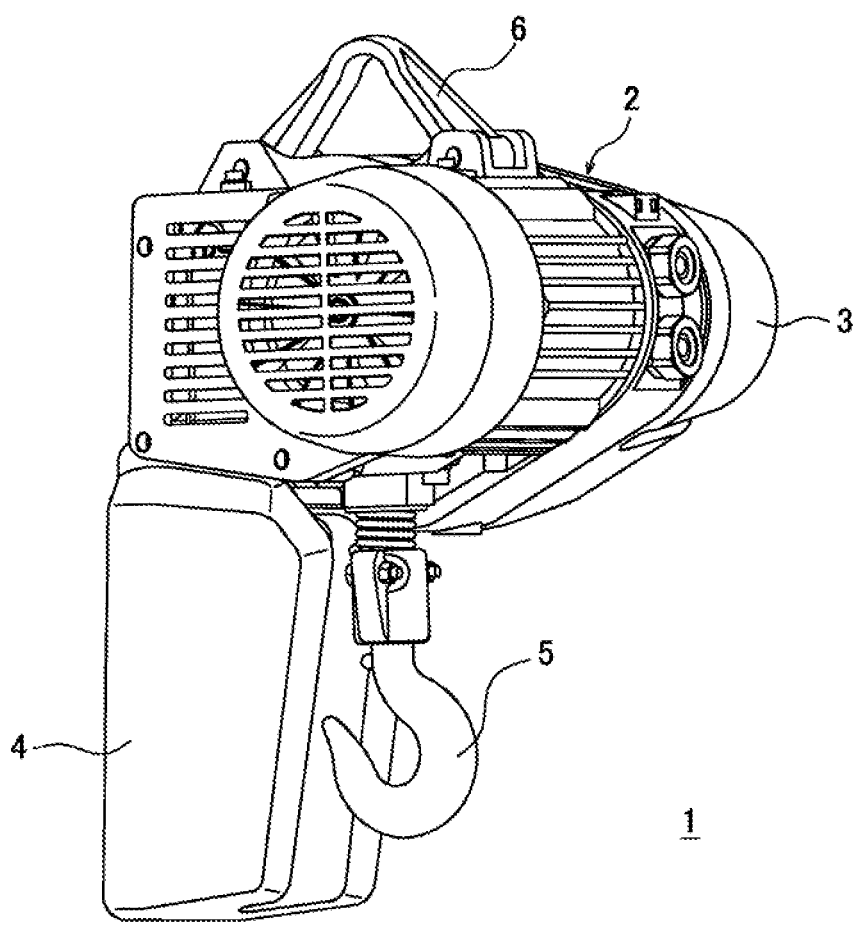
FIG. 1 is an external appearance perspective view of a three-phase/single-phase alternating-current power supply compatible electrically driven chain block according to the invention of this application.
Figure 2:
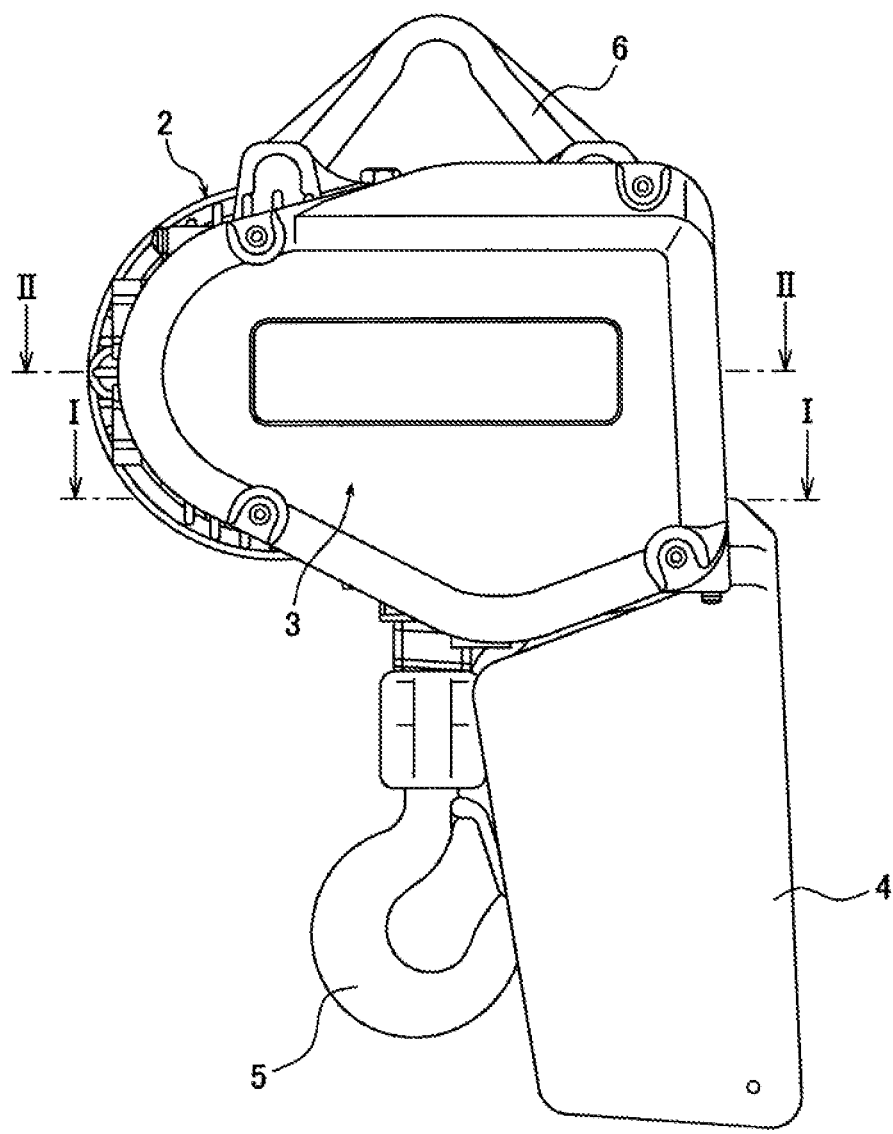
FIG. 2 is an external appearance side view of the three-phase/single-phase alternating-current power supply compatible electrically driven chain block according to the invention of this application.
Figure 3:
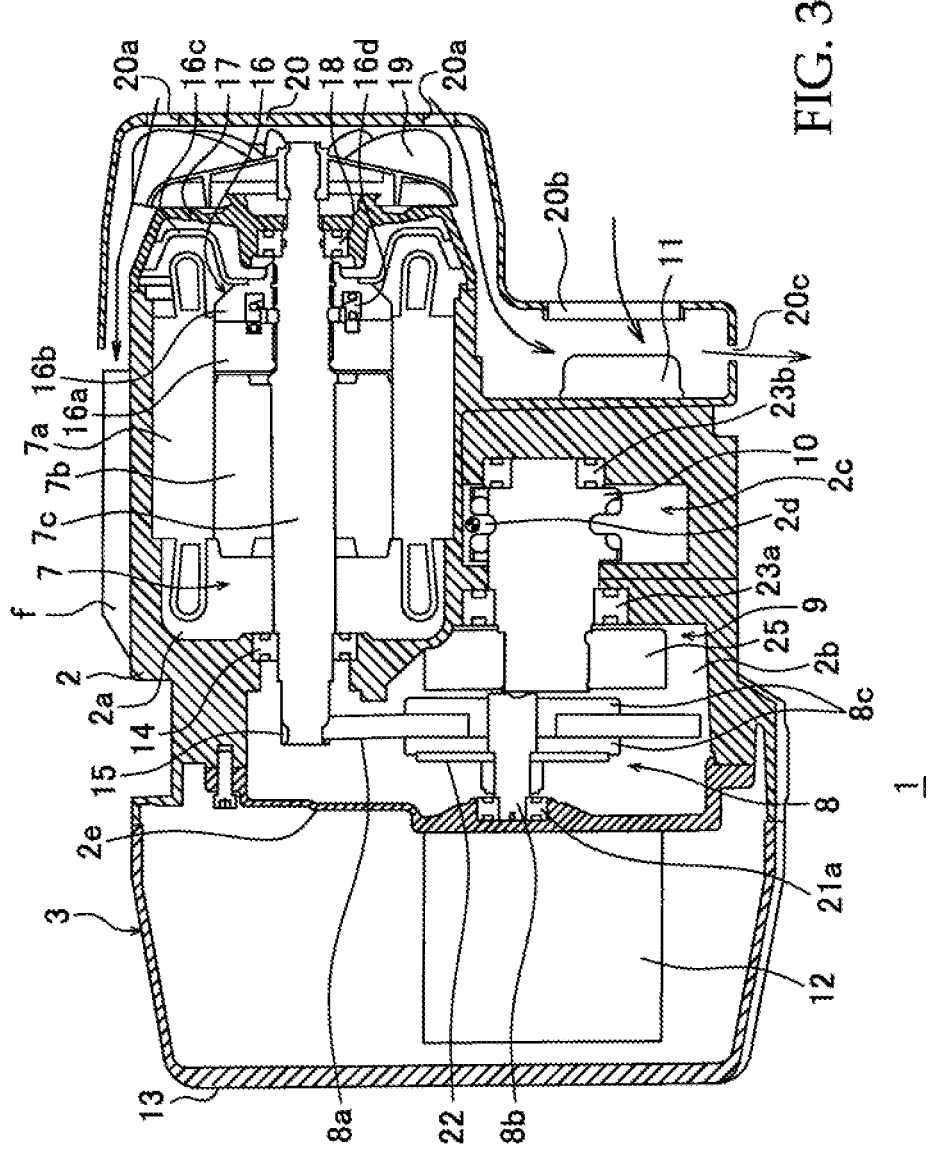
FIG. 3 is an I-I sectional view of the three-phase/single-phase alternating-current power supply compatible electrically driven chain block shown in FIG. 2.
Figure 4:
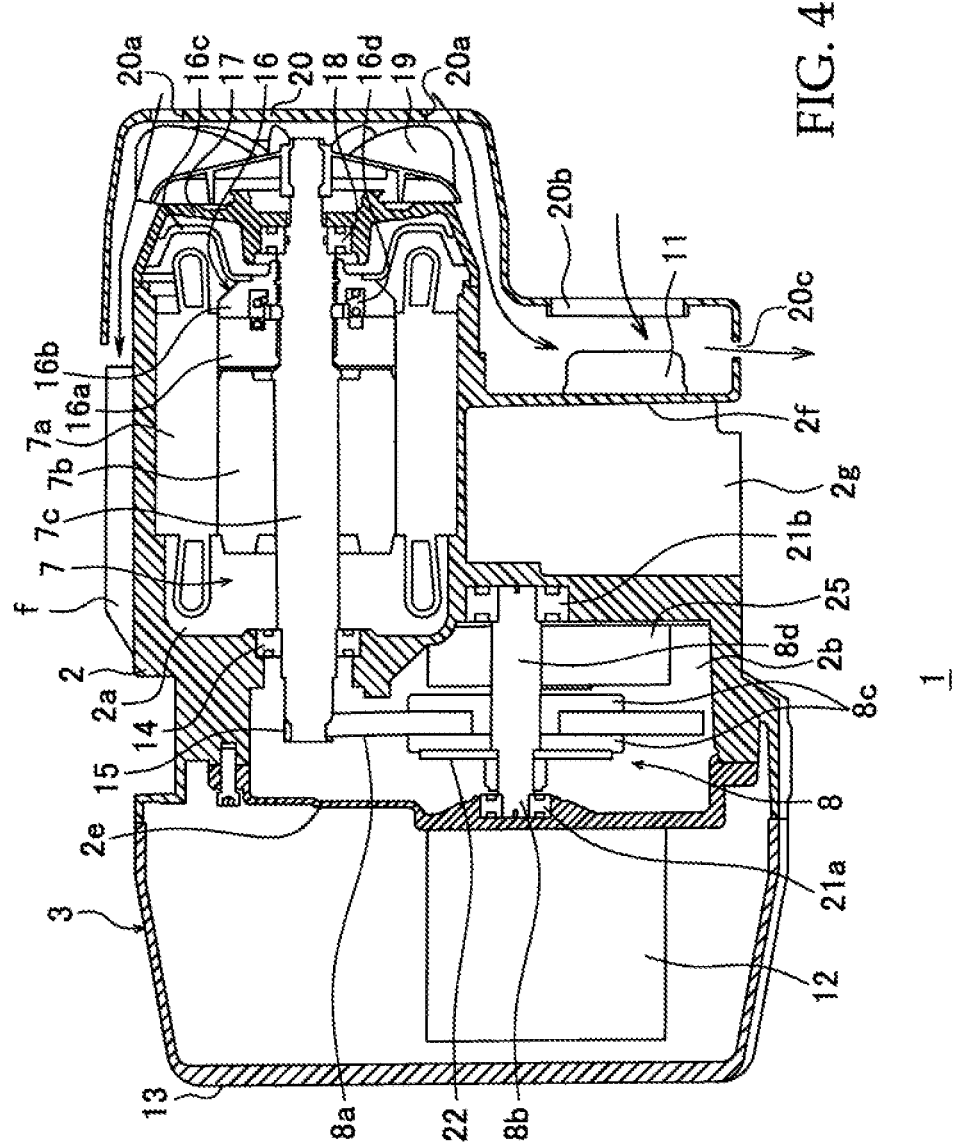
FIG. 4 is an II-II sectional view of the three-phase/single-phase alternating-current power supply compatible electrically driven chain block shown in FIG. 2.

Embodiments of the present invention will be explained below in detail. First of all, a three-phase/single-phase alternating-current power supply compatible electrically driven hoisting machine according to the present invention will be explained by taking an electrically driven chain block as an example. However, electrically driven hoisting machines to which the present invention is applicable are not limited to electrically driven chain blocks, but the present invention is also applicable to other electrically driven hoisting machines, e.g., electrically driven hoists, as a matter of course. FIGS. 1 and 2 are diagrams showing an external configuration example of an electrically driven chain block according to the present invention. FIG. 3 is an I-I sectional view of FIG. 2, and FIG. 4 is an sectional view of FIG. 2.

An electrically driven chain block 1 of the present invention has a casing 2. The casing 2 contains a three-phase alternating-current motor (three-phase alternating-current electric motor) 7 for load hoisting up and down (lifting and lowering) which is driven by an inverter, as will be detailed later. The casing 2 further contains a speed reduction section 9 including a speed reduction mechanism part 8 for reducing the rotational speed of the three-phase alternating-current motor 7. Further, the casing 2 contains a load sheave 10 to which power is transmitted from the speed reduction mechanism part 8 of the speed reduction section 9, and so forth. The load sheave 10 has a load chain (not shown) suspended therefrom to hang a load, and is configured to hoist up and down (lift and lower) the load chain by rotating (forward and reverse) upon receiving power from the speed reduction mechanism part 8. Further, the casing 2 has an electrical component accommodating part 3 adjoined to a side thereof, and a chain basket 4 attached to a lower side portion of the electrical component accommodating part 3. Reference numeral 5 denotes a bad hanging hook attached to the lower end of the load chain to hang a load.

The casing 2 is provided on the top thereof with a hanger 6 for hanging the electrically driven chain block 1 from a building beam (not shown). It should be noted that a hanging hook for hanging the electrically driven chain block 1 may be provided in place of the hanger 6.

The electrical component accommodating part 3 is divided from the outside by a controller cover 13 made of a light alloy, e.g. ADC (Aluminum Die Cast). The electrical component accommodating part 3 is configured to accommodate therein electrical components such as a unitized inverter control device 12, a single-phase AC-DC converter unit 80 or 80' (see FIGS. 7 and 8) used when the electrically driven chain block 1 is used as a single-phase alternating-current power supply compatible type, which will be detailed later, and a power supply noise filter (see FIG. 10), which will be explained later. The interior of the casing 2 is divided into a motor chamber 2a and a mechanism chamber 2b for accommodating and disposing the three-phase alternating-current motor 7 for load hoisting up and down and the speed reduction mechanism part 8 at respective positions.

The three-phase alternating-current motor 7 has a cylindrical motor stator 7a having a stator coil wound therearound, and a motor rotor 7b disposed by being rotatably inserted into a bore longitudinally formed in a center portion of the motor stator 7a. The motor rotor 7b includes a motor shaft 7c integrally seemed thereto to extend in the longitudinal center axis direction. The motor shaft 7c is rotatably supported at a portion thereof closer to the left end as seen in the figure through a bearing 14 by a partition wall dividing the interior of the casing 2 into the motor chamber 2a and the mechanism chamber 2b. In addition, the motor shaft 7c has a pinion gear 15 formed on a left end portion thereof so that pinion gear 15 is meshed with a first speed reduction gear 8a of the speed reduction mechanism part 8 (explained later).

In addition, the motor stator 7a has a pull rotor type brake 16 attached to a portion closer to the right end thereof. A portion of the motor shaft 7c closer to the right end thereof is inserted into an end covet 17 through a bearing 18. The motor shaft 7c has a fan 19 attached to the right end thereof as a forced cooling device.

The brake 16 includes a pull rotor 16a made of a magnetic material, which is spline-engaged with the motor shaft 7c, a movable core 16b made of a magnetic material, which is disposed adjacent to the pull rotor 16a and a brake drum 16c secured to the movable core 16b. The movable core 16b is spline-connected to the motor shaft 7c so as to be non-rotatable but movable within a predetermined range in the axial longitudinal direction. Between the movable core 16b and the pull rotor 16a is disposed a coil spring 16d to constantly press the brake drum 16c into contact with the inner peripheral surface of the end cover 17.

The fan 19 is attached to an end portion of the motor shaft 7c at a side thereof remote from the pinion gear 15 to project outward of the end cover 17. The fan 19 is covered with a fan cover 20. The end cover 17 is provided with intake ports 20a, an opening 20b, and an exhaust port 20c.

Reference numeral 11 denotes a regenerative resistor. The regenerative resistor 11 is attached to a plate-shaped regenerative resistor mounting portion 2f of the casing 2 that projects sideward of the three-phase alternating-current motor 7 in a direction perpendicular to the motor shaft 7c. A side surface of the regenerative resistor mounting portion 2f opposite to the side surface to which the regenerative resistor 11 is attached is formed with a rib 2g extending from the side surface toward the mechanism chamber 2b. Heat generated from the regenerative resistor 11 is transmitted to the regenerative resistor mounting portion 2f and the rib 2g, and the regenerative resistor 11 is forcedly air-cooled by air taken into the inside of the fan cover 20 through the intake ports 20a by the rotation of the fan 19 and also naturally cooled by the rib 2c.

To operate the three-phase alternating-current motor 7 for hoisting up and down, the motor stator 7a is supplied with three-phase alternating-current electric power from the inverter of the inverter control device 12, which is disposed in the electrical component accommodating part 3. When the motor stator 7a is supplied with the three-phase alternating-current electric power, a three-phase alternating current flows through the stator coil of the motor stator 7a to produce a rotating magnetic field. The pull rotor 16a of the brake 16 is magnetized by a partial magnetic field forming the rotating magnetic field, and the movable core 16b is attracted against the urging force of the coil spring 16d. Consequently, the brake drum 16c, which is secured to the movable core 16b, separates from the inner peripheral surface of the end cover 17, and thus the brake 16 is released.

When the brake 16 is released, the motor rotor 7b of the three-phase alternating-current motor 7 for hoisting up and down rotates, and the rotational force of the motor rotor 7b is transmitted to a load gear 25 through the first speed reduction gear 8a of the speed reduction mechanism part 8, which is meshed with the pinion gear 15 at the left end of the motor shaft 7c, and through a second speed reduction gear 8d of the speed reduction mechanism part 8. The rotational force is further transmitted from the load gear 25 to the load sheave 10, causing the load sheave 10 to rotate, thereby allowing the load chain to be wound or unwound. That is when an operation command pushbutton switch (explained later) is actuated to perform a hoisting-up operation, the load hanging hook 5 attached to the load chain is lifted, and the load suspended from the load hanging hook 5 is lifted. Conversely, a hosting-down operation enables lowering of the load attached to the load hanging hook 5.

Figure 5:
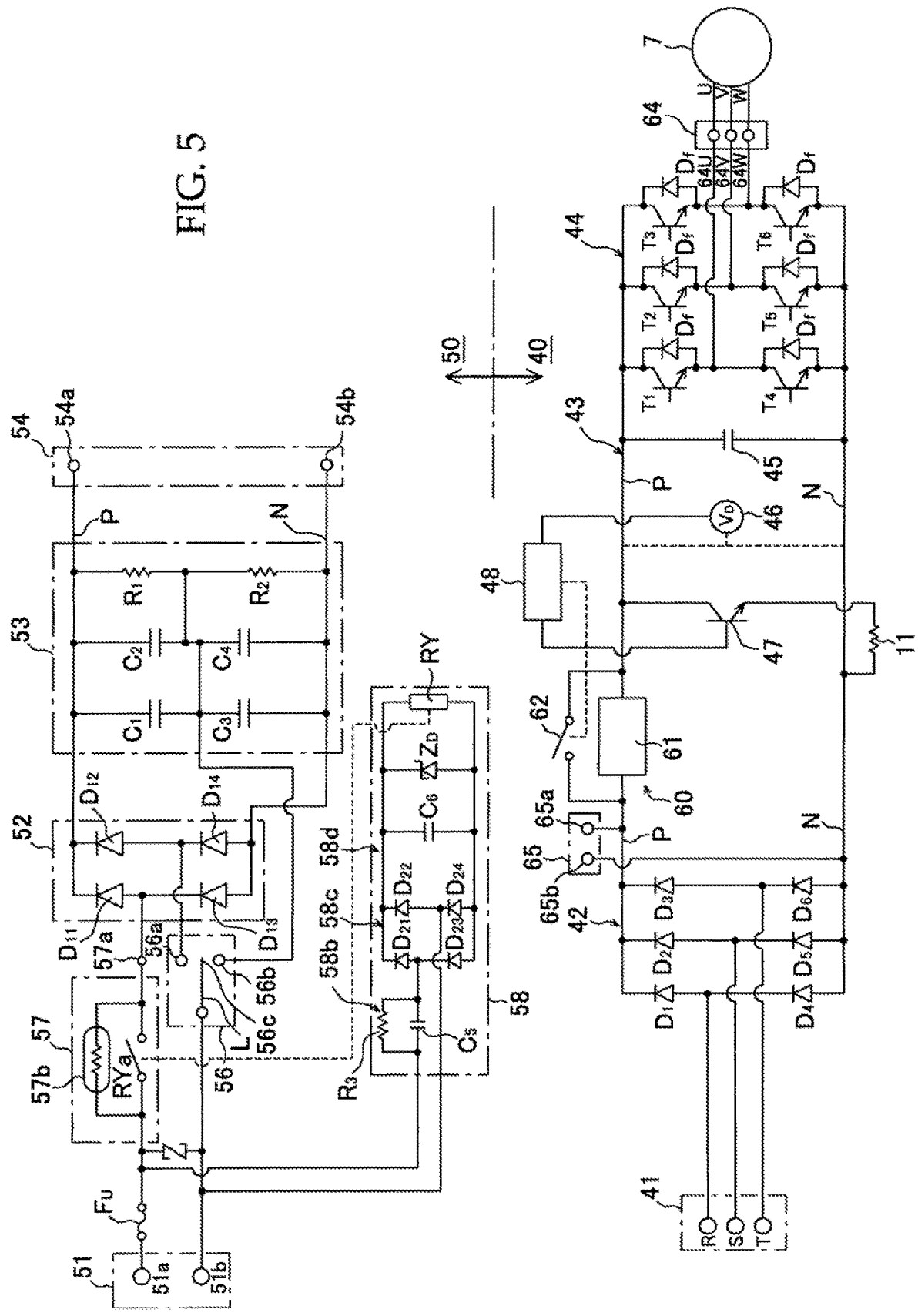
FIG. 5 is a diagram showing a configuration example of a power supply circuit of the three-phase/single-phase alternating-current power supply compatible electrically driven chain block according to the invention of this application.

FIG. 5 is a diagram showing a configuration example of a power supply circuit supplying driving electric power to the three-phase alternating-current motor 7 of the above-described electrically driven chain block 1. A power supply circuit 40 for supplying driving electric power to the three-phase alternating-current motor 7 for load hoisting up and down has a three-phase alternating-current input terminal 41 to which is connectable a three-phase alternating current (R, S, T) from a three-phase alternating-current power supply (a three-phase alternating-current power supply of 230 V in this case), a three-phase AC-DC converter 42 rectifying a three-phase alternating current input to the three-phase alternating-current input terminal 41, a direct-current circuit 43 connected to the output side of the three-phase AC-DC converter 42, and an inverter 44 connected to the output side of the direct-current circuit 43 and converting a direct current electric power from the direct-current circuit 43 into three-phase alternating-current electric power having a predetermined frequency.

The three-phase AC-DC converter 42 includes six diodes $D_1$ to $D_6$ constituting a three-phase bridge circuit. The R phase, S phase and T phase of the three-phase alternating-current input terminal 41 are respectively connected to the node between the diodes $D_1$ and $D_4$, to the node between the diodes $D_2$ and $D_5$, and to the node between the diodes $D_3$ and $D_6$. The direct-current circuit 43 has a smoothing capacitor 45 connected between the positive P and negative N electrodes thereof. The inverter 44 has six switching transistors $T_1$ to $T_6$ connected in a three-phase bridge configuration and further has flywheel diodes $D_f$ connected in parallel to the switching transistors $T_1$ to $T_6$, respectively. The reference numeral 64 denotes an inverter output terminal for outputting a three-phase alternating current (U, V, W) from the inverter 44 to the three-phase alternating-current motor 7.

The direct-current circuit 43 has a voltage sensor 46 installed therein to detect a direct-current voltage $V_D$ between the positive P electrode and the negative N electrode. The direct-current voltage $V_D$ detected by the voltage sensor 46 is output to a control section 48. The direct-current circuit 43 further has between the positive P and negative N electrodes a series circuit of a regenerative resistor (lifting-lowering braking resistor) 11 and a lifting-lowering braking switching device (power transistor) 47. When the direct-current voltage $V_D$ of the direct-current circuit 43 reaches a predetermined voltage value (380 V in this case) owing to regenerative electric power from the three-phase alternating-current motor 7 during a load hoisting-down operation, the lifting-lowering braking switching device 47 is turned on to supply a regenerative power current to the regenerative resistor 11, thereby consuming the regenerative electric power as heat generated in the regenerative resistor 11.

Further, the direct-current circuit 43 is provided with an inrush current preventing circuit 60 preventing an excessive inrush current from flowing into the smoothing capacitor 45 when the power supply is turned on. The inrush current preventing circuit 60 has an inrush current suppressing resistor 61 and a make-and-break contact 62 bypassing (disabling) the inrush current suppressing resistor 61. The make-and-break contact 62 is open-close controlled by the control section 48. That is, when the three-phase power supply is turned on, the make-and-break contact 62 is turned off only for a predetermined time (e.g. 1 second) so that the electric current flows into the smoothing capacitor 45 after passing through the inrush current suppressing resistor 61, thereby suppressing an excessive inrush current from flowing into the smoothing capacitor 45. After the above-described predetermined time has elapsed, the make-and-break contact 62 is turned on to bypass (disable) the inrush current suppressing resistor 61. It should be noted that reference numeral 65 denotes a connecting terminal for connecting output terminals 54a and 54b of a single-phase AC-DC converter circuit unit 50 (explained later). The connecting terminal 65 has a terminal 65a connected to the positive P electrode of the direct-current circuit 43 and a terminal 65b connected to the negative N electrode of the direct-current circuit 43.

The power supply circuit of the present invention differs from the power supply circuit of the publicly known inverter-driven electric chain block mainly in that, when the electrically driven chain block 1 is used as a single-phase alternating-current power supply compatible type, the power supply circuit of the present invention has the single-phase AC-DC converter circuit unit 50 in addition to the above-described power supply circuit 40. The single-phase AC-DC converter circuit unit 50 has a single-phase alternating-current input terminal 51 including terminals 51a and 51b to which is connectable a single-phase alternating current from a single-phase alternating-current power supply (not shown); a single-phase AC-DC converter 52 converting the single-phase alternating current input to the single-phase alternating-current input terminal 51 into a direct current; a direct-current circuit 53 having smoothing capacitors $C_1$ to $C_4$ smoothing the direct current output from the single-phase AC-DC converter 52; and a direct-current output terminal 54. The direct-current output terminal 54 has an output terminal 54a of positive P electrode and an output terminal 54b of negative N electrode. The output terminal 54a of positive P electrode is connectable to the terminal 65a connected to the positive P electrode of the direct-current circuit 43 of the power supply circuit 40. The output terminal 54b of negative N electrode is connectable to the terminal 65b connected to the negative N electrode of the direct-current circuit 43 of the power supply circuit 40. It should be noted that a fuse $F_U$ is connected between the terminal 51a and one input terminal of the single-phase AC-DC converter circuit unit 50.

The single-phase AC-DC converter 52 includes four diodes $D_{11}$ to $D_{14}$ constituting a bridge circuit. The node between the diodes $D_{11}$ and $D_{13}$ is connected to a terminal 57a of an inrush current preventing circuit 57, and the node between the diodes $D_{12}$ and $D_{14}$ is connected to a contact terminal 56a of a single-phase power supply change-over switch 56 (explained later). In addition, the negative electrodes of the diodes $D_{11}$ and $D_{12}$ are connected to the positive P electrode of the direct-current circuit 53, and the positive electrodes of the diodes $D_{13}$ and $D_{14}$ are connected to the negative N electrode of the direct-current circuit 53.

The direct-current circuit 53 includes four smoothing capacitors $C_1$ to $C_4$ and two resistors $R_1$ and $R_2$. The smoothing capacitors $C_1$ and $C_3$, the smoothing capacitors $C_2$ and $C_4$, and the resistors $R_1$ and $R_2$ are connected in series, respectively, and the three series circuits are connected in parallel. One node of the three series circuits is connected to the output terminal 54a as a positive P electrode, and the other node thereof is connected to the output terminal 54b as a negative N electrode. The node between the smoothing capacitors $C_1$ and $C_3$, the node between the smoothing capacitors $C_2$ and $C_4$, and the node between the resistors $R_1$ and $R_2$ are connected to each other and further connected to a contact terminal 56b of the single-phase power supply change-over switch 56.

Among commercial single-phase power supplies connectable to the single-phase alternating-current input terminal 51 of the single-phase AC-DC converter circuit unit 50 are those whose alternating current voltages are 115 V and 230 V, respectively. Regardless of whether the alternating current voltage connected to the terminals 51a and 51b of the single-phase alternating-current input terminal 51 is 115 V or 230 V, the direct-current voltage output from the output terminals 54a, and 54b of the direct-current output terminal 54 of the single-phase AC-DC converter circuit unit 50 needs to be a predetermined constant value. In other words, the direct-current output voltage of the single-phase AC-DC converter circuit unit 50 needs to be the same value as the direct-current voltage value between the positive P and negative N electrodes of the direct-current circuit 43 when a three-phase alternating-current power supply of 230 V is input to the three-phase alternating-current input terminal 41 of the power supply circuit 40.

Accordingly, on the assumption that there are commercial single-phase alternating-current power supplies whose voltage values are 115 V and 230 V, respectively, when the voltage value of the single-phase power supply connected to the single-phase alternating-current input terminal 51 is 115 V, the single-phase power supply change-over switch 56 is changed over to the contact terminal 56b side, and when the voltage value is 230 V, the single-phase power supply change-over switch 56 is changed over to the contact terminal 56a side.

Consequently, when the voltage value of the single-phase power supply is 115 V, the terminal 51b of the single-phase alternating-current input terminal 51 is connected through the single-phase power supply change-over switch 56 to the node between the smoothing capacitors $C_1$ and $C_3$, to the node between the smoothing capacitors $C_2$ and $C_4$, and to the node between the resistors $R_1$ and $R_2$. Accordingly, the single-phase AC-DC converter 52 functions as a voltage doubler rectifier circuit, and the direct-current voltage value between the terminals 54a and 54b of the direct-current output terminal 54 is 115 V×2×√2=325 V. On the other hand, when the single-phase power supply voltage value is 230 V, the terminal 51b of the single-phase alternating-current input terminal 51 is connected to the node between the diodes $D_{12}$ and $D_{14}$ of the single-phase AC-DC converter 52 through the single-phase power supply change-over switch 56. Accordingly the single-phase AC-DC converter 52 functions as a full-wave rectifier circuit, and the voltage value between the output terminals 54a and 54b of the single-phase AC-DC converter circuit unit 50 is 230 V×√2=325 V. That is, regardless of whether the voltage value of the single-phase alternating current input to the terminals 51a and 51b of the single-phase alternating-current input terminal 51 is 115 V or 230 V the direct-current voltage value between the terminals 54a and 54b of the direct-current output terminal 54 can be kept at a predetermined direct-current voltage value by switching the single-phase power supply change-over switch 56.

The single-phase AC-DC converter circuit unit 50 is provided with an inrush current preventing circuit 57 preventing an excessive electric current from flowing into the smoothing capacitors $C_1$ to $C_4$ of the direct-current circuit 53 when the power supply is turned on. The inrush current preventing circuit 57 is connected between the terminal 51a of the single-phase alternating-current input terminal 51 and the node between the diodes $D_{11}$ and $D_{13}$ of the single-phase AC-DC converter 52. The inrush current, preventing circuit 57 comprises a thermistor 57b and a normally open contact RYa of a relay RY connected in parallel to the thermistor 57b. Reference numeral 58 denotes a relay driving circuit driving the relay RY.

The relay driving circuit 58 comprises a parallel circuit 58b of a resistor $R_3$ and a capacitor $C_5$; a rectifier circuit 58c formed by four diodes $D_{21}$ to $D_{24}$ constituting a bridge circuit; and a direct-current circuit 58d including a delay capacitor $C_6$ and a Zener diode $Z_D$. When a single-phase alternating current is supplied to the single-phase alternating-current input terminal 51 and the voltage value of the direct-current circuit 58d reaches a predetermined voltage value with a delay of a predetermined time determined by the capacitance of the delay capacitor $C_6$ and so fourth from the time when the power supply has been turned on, the relay RY operates, and the contact RYa of the relay RY is turned on to bypass the thermistor 57b.

It should be noted that the resistance value of the resistor $R_3$, the respective capacitance values of the capacitor $C_5$ and the delay capacitor $C_6$, and the Zener voltage value of the Zener diode $Z_D$ are determined by taking into account the timing at which the contact RYa of the relay RY is turned on after the single-phase power supply has been turned on, i.e. the timing at which the inrush current decreases to a predetermined value, and so forth. Here, it is assumed that $R_3$=2070 Ω, $C_5$=1.5 μF, $C_{6b=1500}$ μF, and the Zener voltage value of $Z_D$=24 V.

In the relay driving circuit 58, at the time when the power supply is turned on, the relay RY is inoperative; therefore, the contact RYa of the relay RY is off, and the electric current is supplied through the thermistor 57b of high resistance value. Accordingly, the inrush current when the power supply is turned on is suppressed by the high resistance of the thermistor 57b. As the temperature of the thermistor 57b rises due to the generation of heat by passage of electric current therethrough, the resistance value of the thermistor 57b increases, and thus the inrush current is further suppressed. In the relay driving circuit 58, on the other hand, the voltage applied to the operating coil of the relay RY rises with the passage of time, and after a predetermined time has elapsed, the relay RY operates, and the contact RYa is turned on to bypass and thus disable the thermistor 57b.

In the above-described example, the relay RY is used as a bypass device bypassing the thermistor 57b, and the contact RYa of the relay RY is configured to bypass the thermistor 57b. It should, however, be noted that the bypass device is not limited to the relay RY. For example, the arrangement may be such that a power transistor is connected in parallel to the thermistor 57b, and that the power transistor is turned on to bypass the thermistor 57b when the charge voltage value of the delay capacitor $C_6$ reaches a predetermined voltage value.

Figure 6:
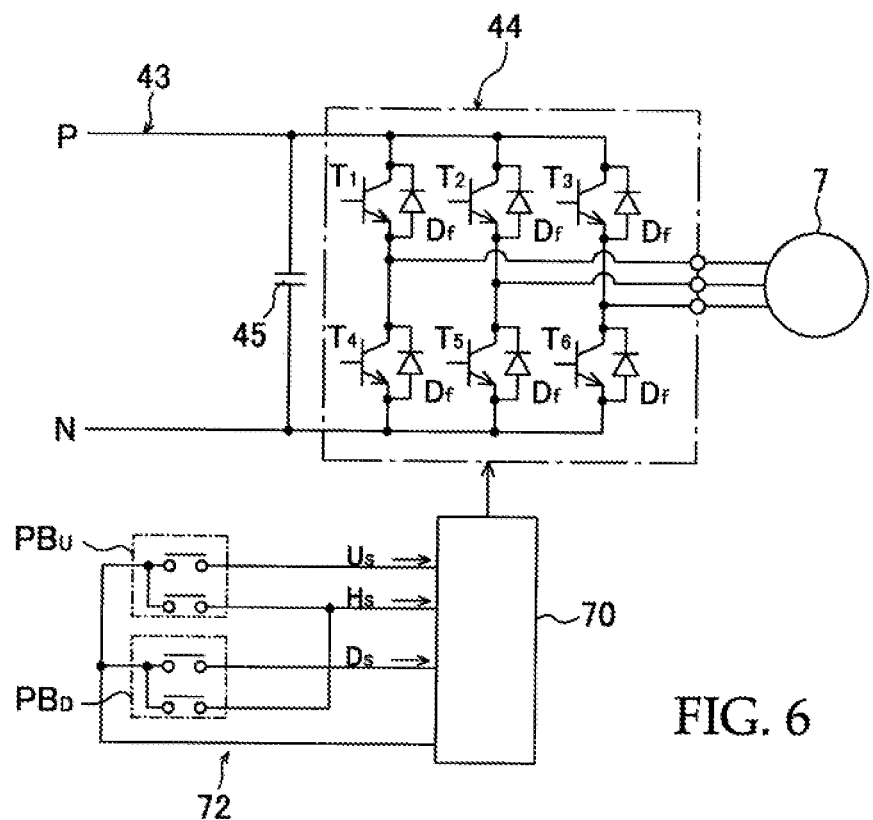
FIG. 6 is a diagram showing a configuration example of an operation section of the three-phase/single-phase alternating-current power supply compatible electrically driven chain block according to the invention of this application.

FIG. 6 is a block circuit diagram showing an example of an operation section for operating the electrically driven chain block 1. The operation section includes an inverter control part 70 controlling the inverter 44, and an operation part 72. The operation part 72 has an operation box (not shown) for operating the electrically driven chain block 1, which is provided with a two-step pushbutton switch $PB_U$ for hoisting up, and a two-step pushbutton switch $PB_D$ for hoisting down. When the two-step pushbutton switch $PB_U$ for hoisting up is pressed to a first step, a hoisting-up signal $U_S$ is output to the inverter control part 70. When the two-step pushbutton switch $PB_U$ for hoisting up is pressed to a second step, a hoisting-up signal $U_S$ and a high-speed signal $H_S$ are output to the inverter control part 70. When the two-step pushbutton switch $PB_D$ for hoisting down is pressed to a first step, a hoisting-down signal $D_S$ is output to the inverter control part 70. When the two-step pushbutton switch $PB_D$ for hoisting down is pressed to a second step, a hoisting-down signal $D_S$ and a high-speed signal $H_S$ are output to the inverter control part 70.

The inverter control part 70, when receiving the hoisting-up signal $U_S$, controls the inverter 44 to output three-phase alternating-current electric power having a predetermined frequency for low-speed forward rotation to the three-phase alternating-current motor 7. Consequently, a three-phase alternating current flows through the motor stator 7a of the three-phase alternating-current motor 7 to generate a rotating magnetic field in the direction of forward rotation. In addition, the pull rotor 16a of the brake 16 is magnetized by a partial magnetic field forming the rotating magnetic field, and thus the brake 16 is released. As a result, the three-phase alternating-current motor 7 is rotated at a predetermined low rotational speed to wind up (lift) the load chain. Accordingly, a load suspended from the load hanging hook 5 is hoisted up at a predetermined low speed.

If the inverter control part 70 receives a high-speed signal $H_S$ during the above-described low-speed load hoisting-up operation, the inverter control part 70 switches the three-phase alternating-current electric power supplied to the three-phase alternating-current motor 7 to three-phase alternating-current electric power having a predetermined frequency for high-speed forward rotation to rotate the three-phase alternating-current motor 7 forward at a predetermined high speed, thereby hoisting up the load at high speed. When the transmission of the high-speed signal $H_S$ and the hoisting-up signal $U_S$ is stopped, the supply of three-phase alternating current to the motor stator 7a of the three-phase alternating-current motor 7 is stopped. Consequently, the pull rotor 16a of the brake 16 is demagnetized, and thus the brake 16 is activated.

Further, when receiving the above-described hoisting-down signal $D_S$, the inverter control part 70 controls the inverter 44 to output a three-phase alternating current of a frequency for low-speed reverse rotation to the motor stator 7a of the three-phase alternating-current motor 7. Consequently, a rotating magnetic field in the direction of reverse rotation is generated in the motor stator 7a. In addition, the pull rotor 16a of the brake 16 is magnetized by a partial magnetic field forming the rotating magnetic field, and thus the brake 16 is released. As a result, the three-phase alternating-current motor 7 is rotated in the reverse direction at a predetermined low rotational speed to hoist down (lower) the load suspended from the load hanging hook 5. If the inverter control part 70 receives a high-speed signal $H_S$ during the low-speed hoisting-down operation, the inverter control part 70 switches the three-phase alternating-current electric power supplied to the three-phase alternating-current motor 7 to three-phase alternating-current electric power having a frequency for high-speed reverse rotation to rotate the three-phase alternating-current motor 7 reversely at a predetermined high speed, thereby hoisting down the load at high speed. When the hoisting-down operation is to be started, the brake 16 is released in the same way as in the above-described hoisting-up operation, and when the hoisting-down operation stops, the brake 16 is activated.

If the power supply circuit 40 shown in FIG. 5 is mounted to the electrically driven chain block 1 configured as shown in FIGS. 1 to 4, a three-phase alternating-current power supply compatible electrically driven chain block is formed. The three-phase alternating-current power supply compatible electrically driven chain block having the power supply circuit 40 is in great demand, as has been stated above. To this regard, it is usually possible to prepare in advance a large stock of electrically driven chain blocks 1 in expectation of a large demand for three-phase alternating-current power supply compatible electrically driven chain blocks, and hence possible to reduce the length of time from receipt of order to delivery of product.

The demand for single-phase alternating-current power supply compatible electrically driven chain blocks is low as compared to the demand for the above-described three-phase alternating-current power supply compatible electrically driven chain block. Accordingly, it is a considerable financial burden for manufacturers to manufacture and stockpile a large number of electrically driven chain blocks using a special-purpose single-phase alternating-current electric motor as a load hoisting up-down electric motor; therefore, manufactures keep no or only a small stock of such electrically driven chain blocks. Consequently, the period of time from receipt of order to delivery of product becomes inevitably long, and the product price becomes high.

In contrast to the above, the three-phase/single-phase alternating-current power supply compatible electrically driven chain block according to the present invention enables a single-phase alternating-current power supply compatible electrically driven chain block to be formed simply by mounting the single-phase AC-DC converter circuit unit 50 to a three-phase alternating-current power supply compatible electrically driven chain block formed by mounting the power supply circuit 40 to the electrically driven chain block 1, as has been stated above. Thus, the three-phase alternating-current power supply compatible electrically driven chain block and the single-phase alternating-current power supply compatible electrically driven chain block share the electrically driven chain block 1 equipped with the power supply circuit 40 with each other, and it is only necessary to stock in advance the electrically driven chain block 1 equipped with the power supply circuit 40. That is, when an order for a single-phase alternating-current power supply compatible electrically driven chain block is received, the electrically driven chain block 1 can be changed into a single-phase alternating-current power supply compatible electrically driven chain block simply by mounting the unitized single-phase AC-DC converter circuit unit 50 to the electrically driven chain block 1. Therefore, the length of time from receipt of order to delivery of product can be reduced to a considerable extent.

More specifically, when an order for a three-phase alternating-current power supply compatible electrically driven chain block is received, the electrically driven chain block 1 equipped with the power supply circuit 40 can be delivered as a three-phase alternating-current power supply compatible type as it is. When an order for a single-phase alternating-current power supply compatible electrically driven chain block is received, the order can be filled simply by equipping the electrically driven chain block 1 with the single-phase AC-DC converter circuit unit 50, which has previously been prepared as a unitized component. Accordingly, the length of time from receipt of order to delivery of product can be reduced to a considerable extent, and it is also possible to reduce the increment in price because it is only necessary to attach the unitized single-phase AC-DC converter circuit unit 50 to a three-phase alternating-current power supply compatible electrically driven chain block.

In addition, the configuration and components of the above-described three-phase alternating-current power supply compatible electrically driven chain block are produced by skilled technology. Therefore, the efficiency and performance of the three-phase alternating-current power supply compatible electrically driven chain block are stabilized, and the price thereof can be reduced. Accordingly, a single-phase alternating-current power supply compatible electrically driven chain block formed by mounting the single-phase AC-DC converter circuit unit 50 to the three-phase alternating-current power supply compatible electrically driven chain block also has stable efficiency and stable performance.

Figure 7:
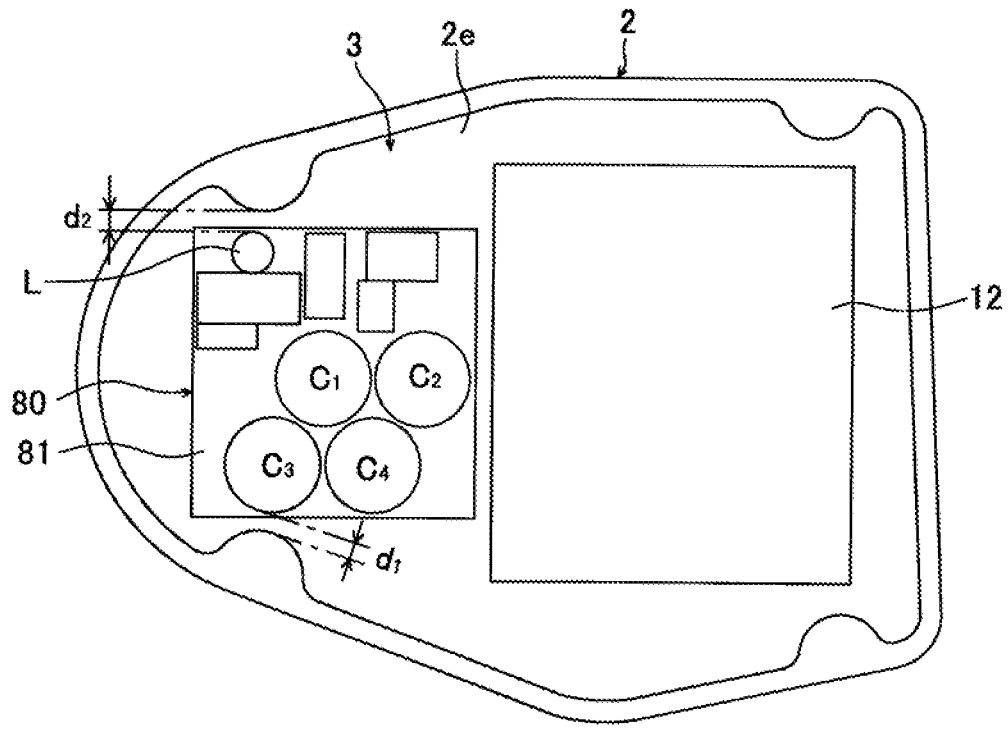
FIG. 7 is a diagram showing an internal configuration example of an electrical component accommodating part of the three-phase/single-phase alternating-current power supply compatible electrically driven chain block according to the invention of this application.

The following is an explanation of the configuration of the unitized single-phase AC-DC converter circuit unit 50 and the way in which the single-phase AC-DC converter circuit unit 50 is installed in the electrically driven chain block 1. FIG. 7 is a diagram showing the interior of the electrical component accommodating part 3 of the electrically driven chain block 1 (i.e. a diagram showing the interior of the electrical component accommodating part 3 as seen from the front of FIG. 2, with the controller cover 13 removed from the structure shown in. FIG. 3). As shown in the figure, the inverter control device 12 and the single-phase AC-DC converter unit 80 are disposed and accommodated in the electrical component accommodating part 3 so as to face an end casing 2e of the casing 2.

The inverter control device 1 is a unit having components of the power supply circuit 40 (shown in FIG. 5) mounted on a substrate or the like. That is, the inverter control device 12 has diodes $D_1$ to $D_6$ constituting a three-phase AC-DC converter 42; a smoothing capacitor 45 constituting a direct-current circuit 43; switching transistors $T_1$ to $T_6$ having flywheel diodes $D_f$ connected thereto in parallel to constitute an inverter 44; an inrush current suppressing resistor 61 constituting an inrush current preventing circuit 60; a make-and-break contact 62; a control section 48; and a voltage sensor 46. The inverter control device 12 has a casing covered with a resin material as an insulating material to ensure insulation.

The three-phase alternating-current input terminal 41 of the inverter control device 12 is disposed at a position where lead wires from a three-phase alternating-current power supply are easily connectable thereto, although not shown in the figure, and the U, V, and W of the inverter output terminal 64 are disposed where lead wires from the three-phase alternating-current motor 7 are easily connectable thereto. In addition, the terminals 65a and 65b of the connecting terminal 65 of the direct-current circuit 43 are disposed at respective positions where lead wires from the output terminals 54a and 54b of the direct-current output terminal 54 of the single-phase AC-DC converter circuit unit 50 are easily connectable thereto (so that the lead wires from the output terminals 54a and 54b can be connected directly to the terminals 65a and 65b without the need to detach other components or wiring), for example.

The single-phase AC-DC converter unit 80 is equipped with components of the single-phase AC-DC converter circuit unit 50 shown in FIG. 5. That is, the single-phase AC-DC converter unit 80 has diodes $D_{11}$ to $D_{14}$ constituting a single-phase AC-DC converter 52; capacitors $C_1$ to $C_4$ and resistors $R_1$ and $R_2$ constituting a direct-current circuit 53; a thermistor 57b constituting an inrush current preventing circuit 57 and a single-phase power supply change-over switch 56. Further, the single-phase AC-DC converter unit 80 has the following components of the relay driving circuit 58: a parallel circuit 58b of a resistor $R_3$ and a capacitor $C_5$; a rectifier circuit 58c comprising, diodes $D_{21}$ to $D_{24}$; and a direct-current circuit 58d including a delay capacitor $C_6$ and a Zeiler diode $Z_D$. These components are mounted on a printed circuit board or the like to unitize the single-phase AC-DC converter unit 80.

The single-phase alternating-current input terminal 51, which has the terminals 51a and 51b, is disposed at a position where lead wires from a single-phase alternating-current power supply are easily connectable thereto (e.g. a position where the lead wires from the single-phase alternating-current power supply can be connected to the terminals 51a and 51b simply by detaching the controller cover 13 or without the need to detach the controller cover 13). The direct-current output terminal 54, which has the output terminals 54a and 54b, is disposed at a position where lead wires from the output terminals 54a and 54b are easily connectable to the terminals 65a and 65b of the connecting terminal 65 of the direct-current circuit 43 of the power supply circuit 40. With this configuration, it is easy to connect the single-phase alternating-current power supply to the terminals 51a and 51b of the single-phase alternating-current input terminal 51 after the unitized single-phase AC-DC converter unit 80 has been disposed in the electrical component accommodating part 3, and it is also easy to connect the output terminals 54a and 54b of the direct-current output terminal 54 of the single-phase AC-DC converter circuit unit 50 to the terminals 65a and 65b of the connecting terminal 65 of the power supply circuit 40. Thus, the three-phase alternating-current power supply compatible electrically driven chain block can be changed into a single-phase alternating-current power supply compatible electrically driven chain block extremely easily.

The layout of the electronic components on a circuit board 81 of the single-phase AC-DC converter unit 80 shown in FIG. 7, particularly the layout of the capacitors $C_1$ to $C_4$, which are electrolytic capacitors of the direct-current circuit 53, is for a case where the casing 2 is sufficiently large with respect to the circuit board 81, i.e. where there is a sufficiently large installation space for the circuit board 81 in the electrical component accommodating part 3. However, if the casing 2 is small and consequently, the installation space for the single-phase AC-DC converter unit 80 in the electrical component accommodating part 3 is small, sufficiently long distances cannot be secured for the insulation distance $d_1$ between the capacitor $C_1$, on the one hand, and, on the other, the casing 2 and the controller cover 13, which are made of a light alloy, and for the insulation distance $d_2$ between the casing 2 and the controller cover 13 on the one hand and the capacitor $C_6$ on the other, which may result in problems in terms of dielectric strength (insulation). In such a case, the electrically driven hoisting machine may not comply with standard regulations regarding dielectric strength (insulation) set by the authorities of the place (e.g. country) where the electrically driven hoisting machine is to be installed, depending on the situation, which makes it impossible to set up the electrically driven hoisting machine.

Figure 8A:
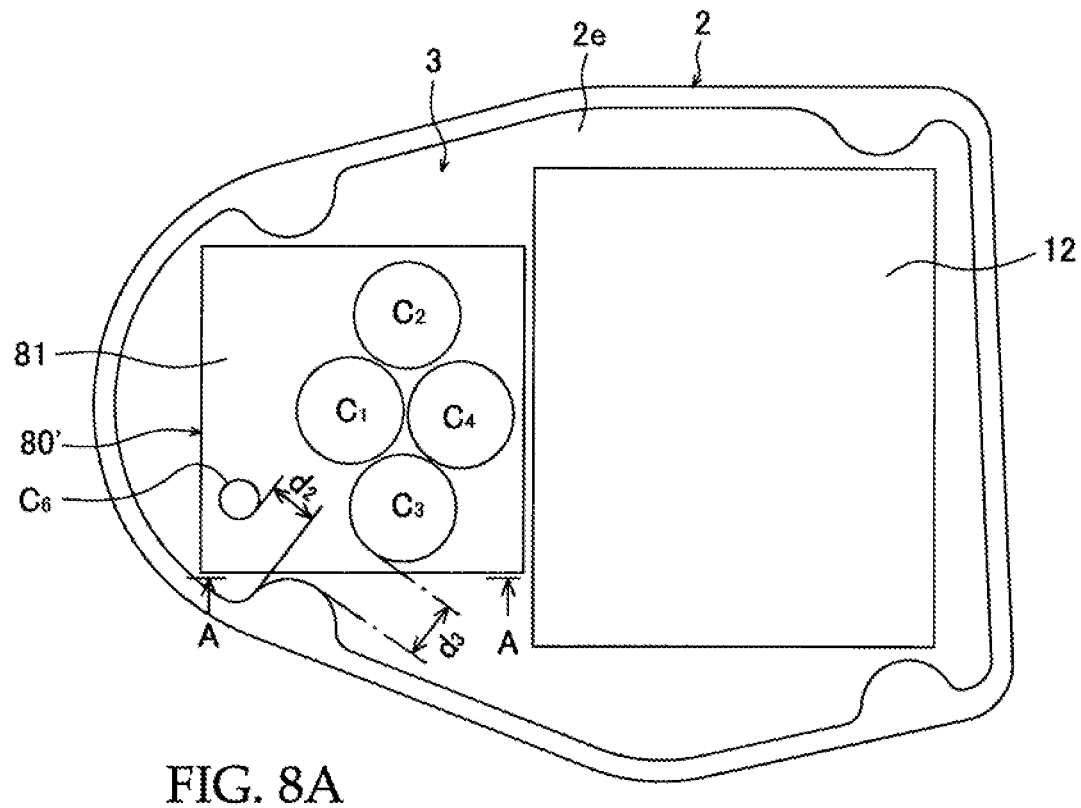
FIG. 8A is a diagram showing another internal configuration example of an electrical component accommodating part of the three-phase/single-phase alternating-current power supply compatible electrically driven chain block according to the invention of this application.
Figure 8B:
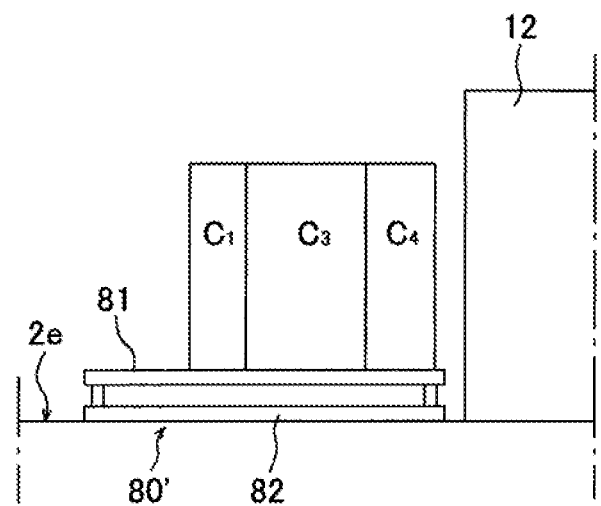
FIG. 8B is a diagram showing another internal configuration example of the electrical component accommodating part of the three-phase/single-phase alternating-current power supply compatible electrically driven chain block according to the invention of this application.

Under the above-described circumstances, either of the following two methods may be employed to solve the dielectric strength (insulation) problem. A first method is to improve the insulation performance of each individual electronic component, and a second method is to change the layout position of the electronic components disposed on the circuit board 81 in the electrical component accommodating part 3, particularly the layout position of the capacitors $C_1$ to $C_4$, which are electrolytic capacitors requiring a large layout space. As a more specific example of the first example to solve the dielectric strength (insulation) problem, there is a method, for example, in which all the capacitors $C_1$ to $C_4$, which are electrolytic capacitors, or at least one of the capacitors requiring reinforced insulation is covered at the outer periphery thereof with an insulating tube (resin-made heat-shrinkable tube having a specified insulating function, not shown in the figure) having a predetermined thickness from the outer side of the skin of the capacitor product. FIG. 8 shows the second example. That is, FIG. 8 shows the interior of the electrical component accommodating part 3 of the electrically driven chain block 1 in which the single-phase AC-DC converter unit 80' is disposed. Let us explain the second example in further detail. FIG. 8(a) shows the way in which the inverter control device 12 and the single-phase AC-DC converter unit 80' are disposed and accommodated in the electrical component accommodating part 3 so as to face the end casing 2e of the casing 2, in the same way as in FIG. 7. FIG. 8(b) is a diagram showing the way in which the single-phase AC-DC converter unit 80' is installed, as seen from the arrow. A-A direction. In the single-phase AC-DC converter unit 80', the capacitors $C_1$ to $C_4$, which need a large installation space, are disposed on the circuit board 81 closer to the inverter control device 12. By disposing the capacitors $C_1$ to $C_4$ closer to the inverter control device 12, a sufficiently long insulation distance $d_3$ to the casing 2 can be secured even for the capacitor $C_3$, which is the closest to the casing 2. To solve the dielectric strength (insulation) problem, either of the first and second examples may be carried out solely. Alternatively, both the first and second examples may be carried out in combination. By so doing, further effective measures can be taken for the dielectric strength (insulation) problem.

In addition, as a result of disposing the capacitors $C_1$ to $C_4$ closer to the inverter control device 12 as has been stated above, a free space is opened on the circuit board 81 (i.e. an area on the circuit board 81 where the capacitor $C_3$ is disposed in FIG. 7). In the space, a lead wire L constituting the switch 56 (not shown) is electrically connected at one end thereof to the single-phase alternating-current input terminal 51, and a plug-in type connecting terminal 56c with an insulating sleeve is electrically connected to the other end of the lead wire L. The terminals 56a and 56b are, as shown in FIG. 5, tabs electrically connected and secured to the electric circuit of the circuit board 81 and configured such that the plug-in type connecting terminal 56c of the lead wire L is selectively connectable to the terminals 56a and 56b. Thus, the terminals 56a and 56b constitute the switch 56. Of the terminals 56a and 56b, the terminal (tab) which is not plugged with the plug-in type connecting terminal 56c of the lead wire L is preferably covered with an insulating member to ensure insulation. Suitable examples of the insulating member include a plug-in type terminal covered with an insulating covering, such as an insulating sleeve and an insulating cap, because these are detachable. The insulating member is temporarily detached from the terminal 56a or 56b when the switch is to be changed over. Therefore, the insulating member is preferably connected to the lead wire L through an insulating material in order to prevent the loss of the insulating member. However, it is also possible to display a warning not to forget to plug the unused terminal with the insulating member by using a caution plate or the like. By taking these measures, the above-described dielectric strength (insulation) problem can be solved. In addition, the casing of the inverter control device 12 is covered with a resin material as an insulating material to ensure insulation, as has been stated above. Therefore, the dielectric strength (insulation) problem will not specially arise if the capacitors $C_1$ to $C_4$ are disposed closer to the inverter control device 12. If it is necessary to further enhance insulation, however, the capacitors $C_1$ to $C_4$ and other electronic components, which have already been subjected to insulation coating as products, may be further insulation-covered with an insulating film. This is also an effective method. In addition, it is preferable for the electrically driven chain block to improve the vibration resistance and impact resistance of the single-phase AC-DC converter circuit unit by bonding together the electronic components to be mounted on the circuit board 81 or bonding the electronic components and the circuit board 81 with silicone or epoxy adhesive.

Figure 9A:
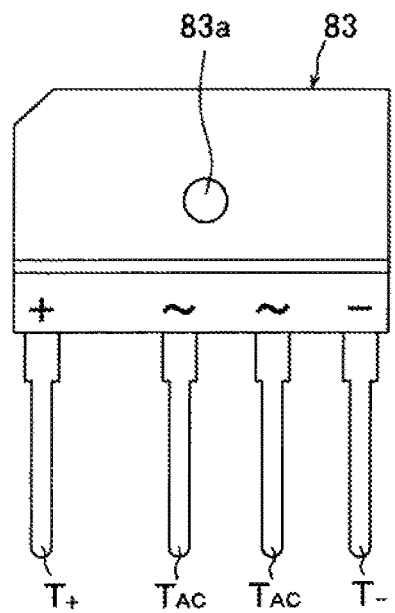
FIG. 9A is a diagram showing a configuration example of apart of a single-phase AC-DC converter unit of the three-phase/single-phase alternating-current power supply compatible electrically driven chain block according to the invention of this application.

Regarding the above-described single-phase AC-DC converter unit 80', there is a commercially available diode bridge device in which the four diodes $D_1$ to $D_4$ constituting the single-phase AC-DC converter 52 shown in FIG. 5 are connected as shown in the figure. FIG. 9(a) is a plan view showing the external appearance of a diode bridge device 83 comprising four diodes $D_1$ to $D_4$ (not shown) connected in the same way as the single-phase AC-DC converter 52 shown in FIG. 5 and entirely molded with an insulating resin material into a flat plate shape. As shown in the figure, the diode bridge device 83 has two single-phase alternating-current input terminals $T_{AC}$ and two direct-current output terminals $T_+$ and $t_-$ on one side of the insulating resin molded body. The diode bridge device 83 has a mounting hole 83a formed in the center thereof.

Figure 9B:
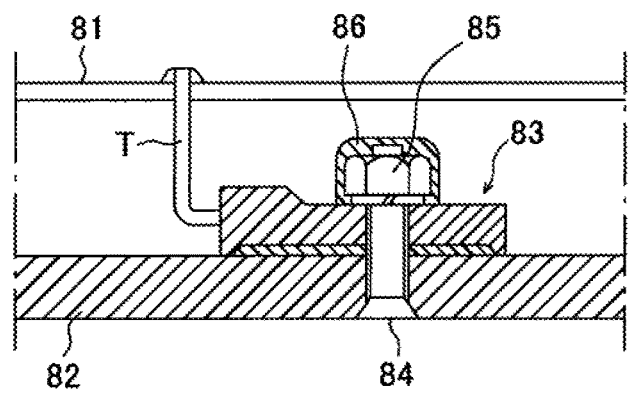
FIG. 9B is a diagram showing a configuration example of a part of a single-phase AC-DC converter unit of the three-phase/single-phase alternating-current power supply compatible electrically driven chain block according to the invention of this application.

When the diode bridge device 83, which has diodes $D_1$ to $D_4$ integrally molded with an insulating resin material as has been stated above, is used as the single-phase AC-DC converter 52, a large amount of heat is generated from the diode bridge device 83, and the generated heat cannot be sufficiently dissipated if the diode bridge is mounted directly on the circuit board 81. To solve the problem, here, a heat dissipation plate 82 serving also as a frame member and made of a material of good thermal conductivity, e.g. aluminum material, is installed underneath the circuit board 81 with a predetermined space therebetween, as shown in FIG. 8(b). That is, a double-layered structure is used for a board for mounting components constituting the single-phase AC-DC converter circuit unit 50, and the diode bridge device 83, which constitutes the single-phase AC-DC converter 52, is mounted on the heat dissipation plate 82 as shown in FIG. 9(b).

The heat dissipation plate 82 serving also as a frame member is provided with a hole for mounting the diode bridge device 83. To mount the diode bridge device 83 to the heat dissipation plate 82, a screw 84 is inserted into the hole in the heat dissipation plate 82, and a nut 85 is threadedly engaged with the distal end of the screw 84 and tightened. It should be noted that, in FIG. 9(b), the distal end of the screw 84 and the nut 85 are covered with a heat-shrinkable tube 86 made of a resin material, thereby enhancing insulation between the circuit board 81, on the one hand, and, on the other, the distal end of the screw 84 and the nut 85. This method is effective when the mounting height of the circuit board 81 from the heat dissipation plate 82 needs to be as low as possible although no heat-shrinkable tube 86 is required when the mounting height of the circuit board 81 is sufficiently high. Further, the terminals T of the diode bridge device 83 are each folded upward, and the distal end portion of the folded terminal T is inserted into a predetermined pattern of the circuit board 81 before being electrically connected to the predetermined pattern.

Thus, the diode bridge device 83, which constitutes the single-phase AC-DC converter 52, is mounted on the heat dissipation plate 82 serving also as a frame member, and the components constituting the single-phase AC-DC converter circuit unit 50 are mounted on the circuit board 81 to form the single-phase AC-DC converter unit 80', as has been stated above. The single-phase AC-DC converter unit 80' is disposed such that the heat dissipation plate 82 of the double-layered board of the single-phase AC-DC converter unit 80' is in close contact with the side surface of the end casing 2e of the casing 2. Consequently, heat generated from the diode bridge device 83, which constitutes the single-phase AC-DC converter 52, is transferred to the end casing 2e through the heat dissipation plate 82 serving also as a frame member and thus effectively dissipated. It should be noted that the double-layered structure comprising the circuit board 81 and the heat dissipation plate 82 is also employed in the single-phase. AC-DC converter unit 80 shown in FIG. 7, and the diode bridge device 83 is also employed for the diodes $D_1$ to $D_4$ of the single-phase AC-DC converter 52.

In the above-described electrically driven chain block equipped with the inverter 44, the switching transistors $T_1$ to $T_6$ of the inverter 44 are turned on and off under the control of the inverter control part 70 using PWM (Pulse Width Modulation) or the like to convert the direct current from the direct-current circuit 43 into a three-phase alternating current of a predetermined frequency, and the inverter 11 supplies the three-phase alternating current to the three-phase alternating-current motor 7 to perform a hoisting up-down operation (lifting-lowering operation) of the electrically driven chain block. In this regard, there is a problem that noise is generated by the on-off operation of the switching transistors $T_1$ to $T_6$ and propagated to the alternating-current power supply and so forth, which has various harmful influences on the power supply and devices connected thereto.

An effective way of eliminating the above-described influences of noise generated by the on-off operation of the switching transistors $T_1$ to $T_6$ of the inverter 44 is to install a noise filter to thereby remove the noise generated. In some countries or regions (e.g. European Union), the law obliges installation of a noise filter to remove noise generated by the on-off operation of switching transistors of inverters of inverter-equipped electrically driven machinery and the like.

Figure 10:
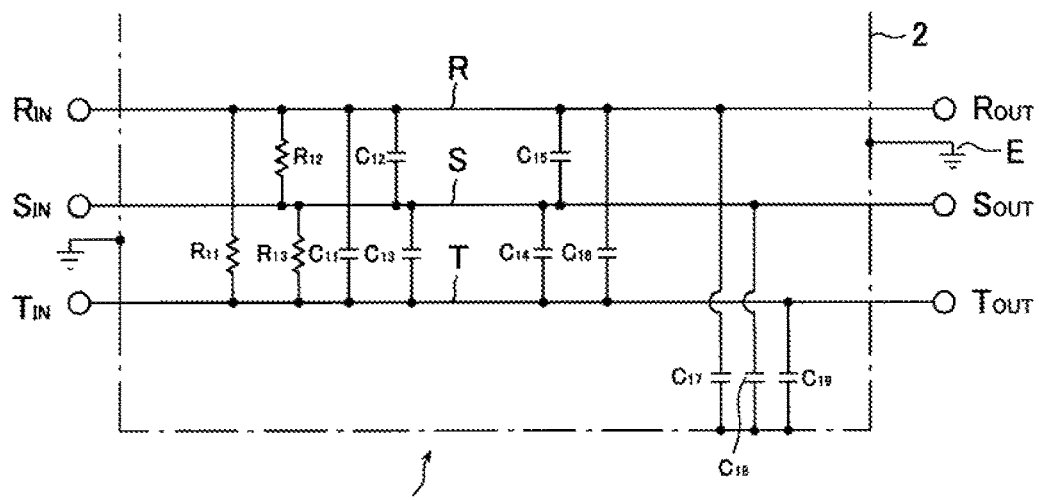
FIG. 10 is a diagram showing a configuration example of a noise filter installed in the three-phase/single-phase alternating-current power supply compatible electrically driven chain block according to the invention of this application.

Under the above-described circumstances, the three-phase/single-phase alternating-current power supply compatible electrically driven chain block according to the present invention also has a noise filter mounted in the electrically-driven chain block 1 to deal with the above-described problem. FIG. 10 is a circuit diagram showing an example of the circuit configuration of the noise filter. A noise filter circuit 90 has electric power lines R, S, and T having input terminals $R_{IN}$, $S_{IN}$, and $T_{IN}$ and output terminals $R_{OUT}$, $S_{OUT}$, and $T_{OUT}$, at both ends thereof, respectively. Between the electric power lines R and S, a resistor $R_{12}$ and capacitors $C_{12}$ and $C_{15}$ are connected. Between the electric power lines S and T, a resistor $R_{13}$ and capacitors $C_{13}$ and $C_{14}$ are connected. Between the electric power lines R and T, a resistor $R_{11}$ and capacitors $C_{11}$ and $C_{16}$ are connected. Further, between the electric power lines R, S, and T on the one hand and the casing 2 on the other, capacitors $C_{17}$, $C_{18}$, and $C_{19}$ are connected. The casing 2 is connected to the earth E.

The noise filter circuit 90 arranged as stated above is inserted between and connected to a three-phase power supply (not shown) and the power supply circuit 40 in such a manner that the input terminals $R_{IN}$, $S_{IN}$, and $T_{IN}$ are connected to the R, S and T phase terminals, respectively, of the three-phase power supply, and that the output terminals $R_{OUT}$, $S_{OUT}$, and $T_{OUT}$ are connected to the R, S and T terminals, respectively, of the three-phase alternating-current input terminal 41 of the power supply circuit 40 of the electrically driven chain block 1. Thus, noise that is generated by the on-off operations of the switching transistors $T_1$ to $T_6$ of the inverter 44 and that would otherwise be propagated to the three-phase alternating-current power supply through the direct-current circuit 43 and the three-phase AC-DC converter 42 is propagated to the earth E through the filter comprising the resistors $R_{11}$ to $R_{13}$ and the capacitors $C_{11}$ to $C_{19}$ and via the casing 2, thereby being removed.

It is possible to easily meet a request for the removal of noise generated by the inverter 11 by previously unitizing the above-described noise filter circuit 90 by mounting components constituting the noise filter circuit 90 on a substrate or the like and arranging; such that the unitized noise filter circuit 90 can be installed in the electrical component accommodating part 3 of the electrically driven chain block 1 shown in FIGS. 7 and 8(a) in response to a request for noise removal.

Although the foregoing embodiment has been explained with regard to an example in which the single-phase alternating-current power supply voltage is either 115 V or 230 V, it should be noted that the single-phase alternating-current power supply voltage may be 100 V or 110 V and its doubled voltage, i.e. 200 V or 220 V In such a case, however, it is preferable to increase the capacitance of the capacitor $C_5$ to from 1.5 µF to 2.2 µF.

Figure 11:
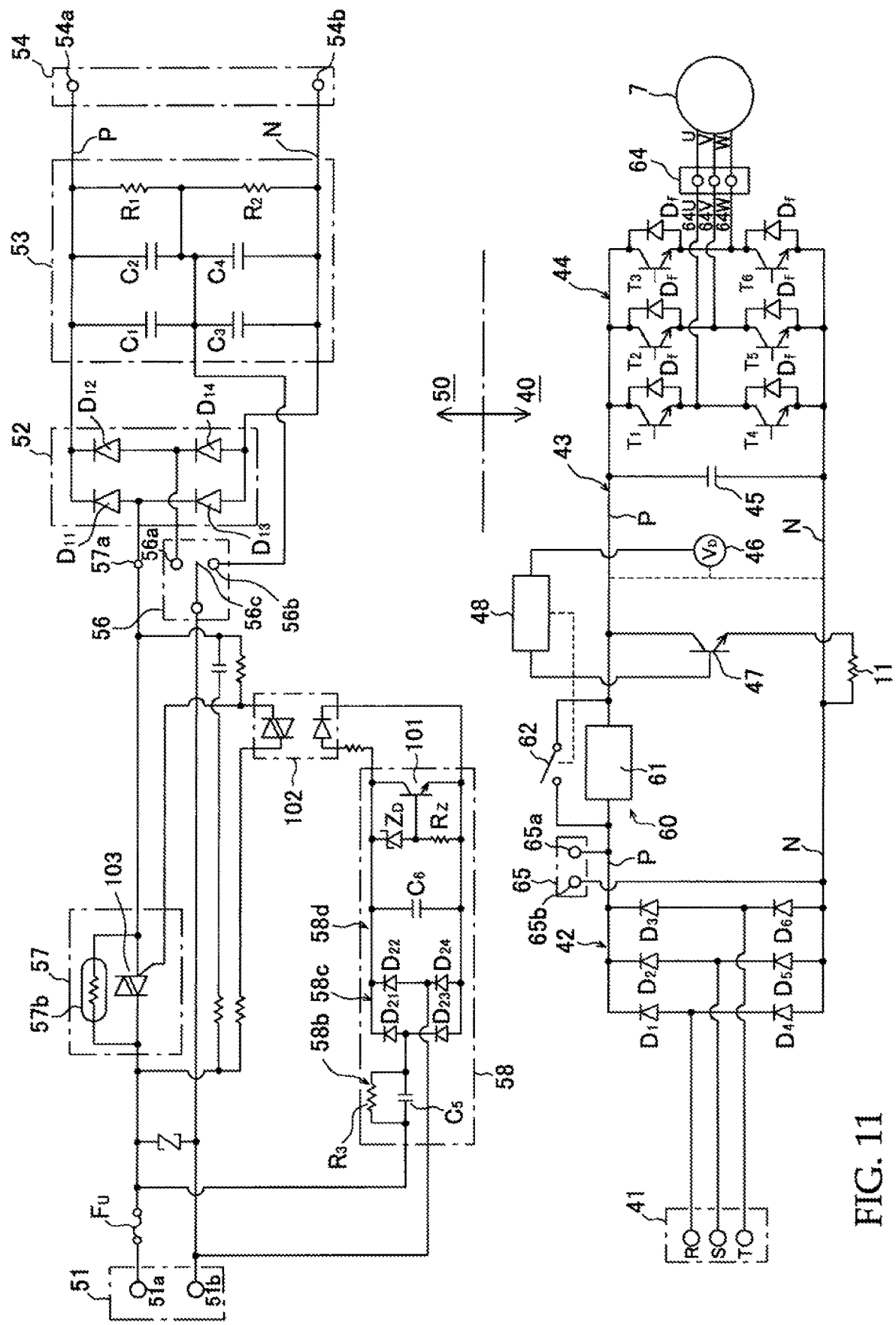
FIG. 11 is a diagram showing a configuration example of a power supply circuit of the three-phase/single-phase alternating-current power supply compatible electrically driven chain block according to the invention of this application.

Further, the mechanical relay RY used in the single-phase AC-DC converter circuit unit 50 of the power supply circuit shown in FIG. 5 may be replaced, with a semiconductor relay. FIG. 11 is a diagram showing the configuration of a power supply circuit using a semiconductor relay in the single-phase AC-DC converter circuit unit 50 in place of the relay RY. As shown in the figure, the semiconductor relay is constructed by including a transistor 101, a photocoupler 102, and a triac 103. The transistor 101 has a collector and an emitter connected between the output terminals of the relay driving circuit 58 and has a base connected between the Zener diode $Z_D$ and a resistor $R_Z$.

When a single-phase alternating current is supplied to the single-phase alternating-current input terminal 51, the voltage value of the direct-current circuit 58d reaches a predetermined voltage value with a delay of a predetermined time determined by the capacitance of the delay capacitor $C_6$ and so forth from the time when the power supply has been turned on. When the voltage between the Zener diode $Z_D$ and the resistor $R_Z$ reaches a predetermined voltage value, the transistor 101 turns on. Consequently, the triac 103 turns on through the photocoupler 102 to bypass the thermistor 57b. The single-phase AC-DC converter circuit unit 50 shown in FIG. 11 is the same as the single-phase AC-DC converter circuit unit 50 of the power supply circuit shown in. FIG. 5 in that the thermistor 57b is bypassed when the voltage of the direct-current circuit 58d reaches a predetermined value, as has been stated above. An explanation of the configuration and operation of the single-phase AC-DC converter circuit unit 50 shown in FIG. 11 will be omitted because the single-phase AC-DC converter circuit unit 50 is the same as the single-phase AC-DC converter circuit unit 50 shown in FIG. 5 except the above mentioned points. An explanation of the configuration and operation of the power supply circuit 40 be omitted because the power supply circuits 40 shown in FIGS. 5 and 11 are the same.

Although an embodiment of the present invention has been described above, the present invention is not limited to the foregoing embodiment but can be modified in a variety of ways without departing from the scope of the claims and the technical idea indicated in the specification and the drawings. For example, although in the foregoing embodiment the three-phase alternating-current induction motor (asynchronous motor) 7 has been explained as a motor for hoisting up and down, by way of example, the hoisting up-down motor is not limited to an induction alternating-current motor (asynchronous induction motor) having three or more phases and supplied with alternating-current electric power but may be a synchronous motor, an AC servomotor, or a DC brushless motor when the inverter 44 is configured to output alternating-current electric power having three or more phases.

REFERENCE SIGNS LIST

1: electrically driven chain block
2: casing

2a: motor chamber
2b: mechanism chamber
2e: end casing
2f: regenerative resistor mounting portion
2g: rib
3: electrical component accommodating part
4: chain basket
5: load hanging hook
6: hanger
7: three-phase alternating-current motor.
7a: motor stator
7b: motor rotor
7c: motor shaft
8: speed reduction mechanism part
8a: first speed reduction gear
8d: second speed reduction gear
9: speed reduction section
10: load sheave
11: regenerative resistor
12: inverter control device
13: controller cover
14: bearing
15: pinion gear
16: brake
16a: pull rotor
16b: movable core
16c: brake drum
16d: coil spring
17: end cover
18: bearing
19: fan
20: fan cover
20a: intake port
20b: opening
20c: exhaust port
25: load gear
40: power supply circuit
41: three-phase alternating-current input terminal
42: three-phase AC-DC converter
43: direct-current circuit
44: inverter
45: smoothing capacitor
46: voltage sensor
47: lifting-lowering braking switching device
48: control section
50: single-phase AC-DC converter circuit unit
51: single-phase alternating-current input terminal
52: single-phase AC-DC convert
53: direct-current circuit
54: direct-current output terminal
56: single-phase power supply change-over switch
57: inrush current preventing circuit
57b: thermistor
58: relay driving circuit
60: inrush current preventing circuit
61: inrush current suppressing resistor
62: make-and-break contact
64: inverter outer t terminal
65: connecting terminal
70: inverter control part
72: operation part
80: single-phase AC-DC converter unit
80': single-phase AC-DC converter unit
81: circuit board
82: heat dissipation plate
83: diode bridge device
84: screw
85: nut
86: heat-shrinkable tube
90: noise filter circuit
101: transistor
102: photocoupler
103: triac

The invention claimed is:

1. A three-phase/single-phase alternating-current power supply compatible electrically driven hoisting machine comprising:

an inverter-equipped electrically driven hoisting machine body of three-phase alternating-current power supply compatible type, the inverter-equipped electrically driven hoisting machine body having a three-phase alternating-current input terminal to which a three-phase alternating-current power supply is connectable, a three-phase AC-DC converter converting a three-phase alternating current input to the three-phase alternating-current input terminal into a direct current, a direct-current circuit connected to an output side of the three-phase AC-DC converter, an inverter connected to an output side of the direct-current circuit and converting a direct current electric power from the direct-current circuit into an alternating-current electric power having a predetermined phase and a predetermined frequency, an alternating-current electric motor for load hoisting up and down connected to an output side of the inverter, and a converting mechanism converting a rotational force of the alternating-current electric motor into a hoisting up-down force of a load hanging device; and a single-phase AC-DC converter unit having a single-phase alternating-current input terminal to which a single-phase alternating-current power supply is connectable, and a single-phase AC-DC converter converting a single-phase alternating current input to the single-phase alternating-current input terminal into a direct current;

wherein, when the inverter-equipped electrically driven hoisting machine body is to be used as a three-phase alternating-current power supply compatible type, the single-phase AC-DC converter unit is not used, and the three-phase alternating-current power supply is connected to the three-phase alternating-current input terminal;

whereas, when the inverter-equipped electrically driven hoisting machine body is to be used as a single-phase alternating-current power supply compatible type, the single-phase AC-DC converter unit is attached to the inverter-equipped electrically driven hoisting machine body, and an output side of the single-phase AC-DC converter unit is connected to the direct-current circuit, and the three-phase alternating-current input terminal is open-circuited from the three-phase alternating-current power supply, and further the single-phase alternating-current power supply is connected to the single-phase alternating-current input terminal of the single-phase AC-DC converter unit.

2. The three-phase/single-phase alternating-current power supply compatible electrically driven hoisting machine of claim 1, wherein the alternating-current electric motor and the converting mechanism of the inverter-equipped electrically driven hoisting machine body are accommodated in a casing, the casing having a side covered with a cover, the cover having an interior defining an electrical component accommodating chamber accommodating electrical components, the electrical component accommodating chamber being capable of accommodating and disposing therein the single-phase AC-DC converter unit.

3. The three-phase/single-phase alternating-current power supply compatible electrically driven hoisting machine of claim 2, wherein the single-phase AC-DC converter unit has an output voltage adjusting device having a power supply voltage switching device and enabling a direct-current output voltage value of the single-phase AC-DC converter unit to be kept at a predetermined constant value even if a single-phase alternating-current power supply voltage input to the single-phase alternating-current input terminal is different by switching the power supply voltage switching device.

4. The three-phase/single-phase alternating-current power supply compatible electrically driven hoisting machine of claim 2, wherein the single-phase AC-DC converter unit has a circuit board and a heat dissipation plate made of a material of excellent thermal conductivity, the heat dissipation plate being installed underneath the circuit board;
the single-phase AC-DC converter of the single-phase AC-DC converter unit comprising a diode bridge, the diode bridge being mounted on the heat dissipation plate, other components of the single-phase AC-DC converter unit being mounted on the circuit board, the heat dissipation plate being disposed such that a surface of the heat dissipation plate on a side thereof remote from the circuit board is in contact with an end casing covering a side end of the casing.

5. The three-phase/single-phase alternating-current power supply compatible electrically driven hoisting machine of claim 2, wherein the single-phase AC-DC converter unit has an inrush current suppressing device suppressing an inrush current when the single-phase alternating-current power supply is turned on.

6. The three-phase/single-phase alternating-current power supply compatible electrically driven hoisting machine of claim 2, which is equippable with a noise filter removing noise generated in a process of conversion of a direct current from the direct-current circuit into an alternating current by the inverter.

7. The three-phase/single-phase alternating-current power supply compatible electrically driven hoisting machine of claim 1, wherein the single-phase AC-DC converter unit has an output voltage adjusting device having a power supply voltage switching device and enabling a direct-current output voltage value of the single-phase AC-DC converter unit to be kept at a predetermined constant value even if a single-phase alternating-current power supply voltage input to the single-phase alternating-current input terminal is different by switching the power supply voltage switching device.

8. The three-phase/single-phase alternating-current power supply compatible electrically driven hoisting machine of claim 7, wherein the single-phase AC-DC converter unit has a circuit board and a heat dissipation plate made of a material of excellent thermal conductivity, the heat dissipation plate being installed underneath the circuit board;
the single-phase AC-DC converter of the single-phase AC-DC converter unit comprising a diode bridge, the diode bridge being mounted on the heat dissipation plate, other components of the single-phase AC-DC converter unit being mounted on the circuit board, the heat dissipation plate being disposed such that a surface of the heat dissipation plate on a side thereof remote from the circuit board is in contact with an end casing covering a side end of the casing.

9. The three-phase/single-phase alternating-current power supply compatible electrically driven hoisting machine of claim 7, wherein the single-phase AC-DC converter unit has an inrush current suppressing device suppressing an inrush current when the single-phase alternating-current power supply is turned on.

10. The three-phase/single-phase alternating-current power supply compatible electrically driven hoisting machine of claim 7, which is equippable with a noise filter removing noise generated in a process of conversion of a direct current from the direct-current circuit into an alternating current by the inverter.

11. The three-phase/single-phase alternating-current power supply compatible electrically driven hoisting machine of claim 1, wherein the single-phase AC-DC converter unit has a circuit board and a heat dissipation plate made of a material of excellent thermal conductivity, the beat dissipation plate being installed underneath the circuit board;
the single-phase AC-DC converter of the single-phase AC-DC converter unit comprising a diode bridge, the diode bridge being mounted on the heat dissipation plate, other components of the single-phase AC-DC converter unit being mounted on the circuit board, the heat dissipation plate being disposed such that a surface of the heat dissipation plate on a side thereof remote from the circuit board is in contact with an end casing covering a side end of the casing.

12. The three-phase/single-phase alternating-current power supply compatible electrically driven hoisting machine of claim 11, wherein the single-phase AC-DC converter unit has an inrush current suppressing device suppressing an inrush current when the single-phase alternating-current power supply is turned on.

13. The three-phase/single-phase alternating-current power supply compatible electrically driven hoisting machine of claim 11, which is equippable with a noise filter removing noise generated in a process of conversion of a direct current from the direct-current circuit into an alternating current by the inverter.

14. The three-phase/single-phase alternating-current power supply compatible electrically driven hoisting machine of claim 1, wherein the single-phase AC-DC converter unit has an inrush current suppressing device suppressing an inrush current when the single-phase alternating-current power supply is turned on.

15. The three-phase/single-phase alternating-current power supply compatible electrically driven hoisting machine of claim 14, wherein the inrush current suppressing device has a thermistor connected between the single-phase alternating-current input terminal and the single-phase AC-DC converter of the single-phase AC-DC converter unit, a bypass device bypassing the thermistor, and a drive circuit driving the bypass device;
the drive circuit having connected thereto a single-phase rectifier circuit, and a delay capacitor connected to an output side of the single-phase rectifier circuit;
the single-phase AC-DC converter unit being configured such that the single-phase AC-DC converter and the drive circuit are simultaneously supplied with electric power from the single-phase alternating-current power supply, the bypass device operating to bypass the thermistor when a charge voltage of the delay capacitor reaches a predetermined voltage value.

16. The three-phase/single-phase alternating-current power supply compatible electrically drivel hoisting machine of claim 15, which is equippable with a noise filter removing noise generated in a process of conversion of a direct current from the direct-current circuit into an alternating current by the inverter.

17. The three-phase/single-phase alternating-current power supply compatible electrically driven hoisting machine of claim 14, which is equippable with a noise filter removing noise generated in a process of conversion of a direct current from the direct-current circuit into an alternating current by the inverter.

18. The three-phase/single-phase alternating-current power supply compatible electrically driven hoisting machine of claim 1, which is equippable with a noise filter removing noise generated in a process of conversion of a direct current from the direct-current circuit into an alternating current by the inverter.

* * * * *